(12) United States Patent
Ripa

(10) Patent No.: US 8,567,576 B2
(45) Date of Patent: Oct. 29, 2013

(54) HYDROPNEUMATIC TELESCOPIC STRUT FOR A BICYCLE

(76) Inventor: Thomas Ripa, Herrsching (DE)

( * ) Notice: Subject to any disclaimer, the term of this patent is extended or adjusted under 35 U.S.C. 154(b) by 304 days.

(21) Appl. No.: 12/972,633

(22) Filed: Dec. 20, 2010

(65) Prior Publication Data

US 2011/0147148 A1    Jun. 23, 2011

Related U.S. Application Data

(60) Provisional application No. 61/287,804, filed on Dec. 18, 2009.

(51) Int. Cl.
*F16F 9/34* (2006.01)
*F16F 9/00* (2006.01)

(52) U.S. Cl.
USPC ..................... 188/322.13; 188/314

(58) Field of Classification Search
USPC ............. 188/322.13, 313–314, 297, 266
See application file for complete search history.

(56) References Cited

U.S. PATENT DOCUMENTS

| | | | | |
|---|---|---|---|---|
| 5,279,480 A * | 1/1994 | Derrien | ................... | 244/104 FP |
| 6,911,050 B2 * | 6/2005 | Molino et al. | ................... | 623/43 |
| 7,261,194 B2 * | 8/2007 | Fox | ................... | 188/275 |
| 2005/0133321 A1 * | 6/2005 | Fujishima et al. | ................ | 188/313 |

FOREIGN PATENT DOCUMENTS

JP               04281418 A    * 10/1992

* cited by examiner

*Primary Examiner* — Anna Momper
(74) *Attorney, Agent, or Firm* — Sughrue Mion, PLLC

(57) ABSTRACT

A hydropneumatic telescopic strut includes a shock absorber having a damper cylinder filled with an incompressible damper fluid, a damper piston displaceable in the damper cylinder, and a damper piston rod. A gas pressure spring has a spring cylinder filled with a compressible suspension fluid and a spring piston arranged such that the spring piston is displaceable in the spring cylinder. The shock absorber and the gas pressure spring are connected in parallel with one another and the shock absorber and the gas pressure spring are movable telescopically upon spring deflection and rebound of the telescopic strut. An equalization reservoir is connected with the damper cylinder such that the damper fluid is provided for volume equalization of a time-variable displacement of the damper fluid by the damper piston rod upon spring deflection and rebound of the telescopic strut.

16 Claims, 9 Drawing Sheets

HYDROPNEUMATIC TELESCOPIC STRUT FOR A BICYCLE

CROSS-REFERENCE TO RELATED APPLICATION

This application claims the benefit of U.S. Provisional Application No. 61/287,804, filed Dec. 18, 2009, which is hereby incorporated by reference in its entirety.

BACKGROUND

The subject matter disclosed herein relates generally to a hydropneumatic telescopic strut for a land vehicle and, more particularly, to a hydropneumatic telescopic strut for a bicycle.

A hydropneumatic telescopic strut for a bicycle or other land vehicle includes a combination of a hydraulic damper and a spring suspension, such as a pneumatic suspension, for example. A bicycle spring with the telescopic strut, for example, a trekking bike or a mountain bike, includes a front wheel suspension and/or a rear wheel suspension. For the suspensions, the hydropneumatic telescopic strut is provided that, for example, includes a single-tube damper for the hydraulic damper and an air pressure chamber spring for the pneumatic spring. The single-tube damper has a working chamber filled with a damper fluid and a gas-filled counter-pressure chamber with which a volume and temperature equalization of the damper fluid can be compensated via a floating piston. A gas-filled spring cylinder with a spring piston that is pre-tensioned against the gas cushion is provided in the air pressure chamber spring.

The characteristic line of the pneumatic spring is normally strongly progressive. However, it is desirable to use a suspension with a characteristic line that is optimally linear over a wide range and possibly only has progressive character given significant spring deflection. The provision of a coil spring (made of steel, for example) that has a linear characteristic line could achieve at least a partial remedy. However, the steel coil spring has a high weight and a limited adjustability, which makes the steel coil spring undesirable for use with a bicycle.

SUMMARY

In one embodiment, the hydropneumatic telescopic strut for a bicycle includes a shock absorber, a gas pressure spring and an equalization reservoir with an equalization chamber. The shock absorber has a damper cylinder filled with an incompressible damper fluid, a damper piston arranged such that it can be displaced in the damper cylinder and a damper piston rod with which the damper piston can be operated from outside the damper cylinder. The gas pressure spring includes a spring cylinder filled with a compressible suspension or spring fluid and a spring piston arranged such that it can be displaced in the spring cylinder. The shock absorber and the gas pressure spring are connected in parallel with one another and the shock absorber and the gas pressure spring can be moved telescopically one inside the other upon spring deflection and rebound of the telescopic strut. The equalization reservoir is connected with the damper cylinder such that the damper fluid can be conducted and is provided for volume equalization of a time-variable displacement of the damper fluid by the damper piston rod upon spring deflection and rebound of the damper strut. The equalization chamber is delimited with a displaceable separator element with which the volume equalization can be accomplished via displacement of the separator element.

The hydropneumatic telescopic strut also includes an auxiliary spring chamber filled with suspension fluid, a switching device, and a coupling with which the switching device is coupled with the separator element such that: the auxiliary spring chamber is connected with the spring cylinder such that suspension fluid can be conducted if the separator element is arranged in a position range between a first predetermined position and a second predetermined position, and the auxiliary spring chamber is isolated in terms of suspension fluid from the spring cylinder if the separator element is arranged outside of the position range.

The spring deflection travel of the telescopic strut is represented by the position of the separator element, such that the position range with its first predetermined position and its second predetermined position correlates with a spring deflection travel range. The first predetermined position can correspond to a minimum spring deflection travel (spring deflection travel=zero) and/or the second predetermined position can correspond to a maximum spring deflection travel at which the telescopic strut is deflected to the maximum extent possible. Depending on the defined first predetermined position and the defined second predetermined position, a link between the momentarily present deflection travel of the telescopic strut and the spring fluid-conductive connection between the auxiliary spring chamber and the gas pressure chamber is established by means of the switching device that is coupled with the separator element via the coupling.

If the auxiliary spring chamber is connected with the gas pressure spring such that suspension fluid can be conducted, the volume of the suspension fluid located in the gas pressure spring is increased by the volume of the suspension fluid located in the auxiliary spring chamber. The suspension fluid volume that is to be compressed by the spring deflection of the telescopic strut is likewise increased by this volume increase, such that the characteristic line of the gas pressure spring is flatter, corresponding to the volume growth caused by the connection of the auxiliary spring chamber with the switching device. In contrast to this, if the auxiliary spring chamber is isolated from the gas pressure camber in terms of suspension fluid, only the volume of the gas pressure spring is effective upon spring deflection of the telescopic strut, such that the characteristic line of the telescopic strut is hereby correspondingly steep. A spring deflection range of the telescopic strut can thus be predetermined via a targeted predetermination of the first and second position of the separator element, which spring deflection range is characterized in that in this range the characteristic line of the telescopic strut is flatter compared to a conventional telescopic strut in which an auxiliary spring chamber according to one embodiment cannot be connected to a gas pressure spring over the entire deflection range.

The first predetermined position and the second predetermined position can be defined such that the first predetermined position is not yet reached given a slight spring deflection of the telescopic strut, and the auxiliary spring chamber is isolated in terms of spring fluid from the gas pressure spring. In this range, the characteristic line of the telescopic strut is sufficiently steep and essentially linear. If a current position of the separator element is located in the range between the first predetermined position and the second predetermined position, the auxiliary spring chamber is connected with the gas pressure chamber such that suspension fluid can be conducted, whereby the characteristic line of the telescopic strut in this range is essentially constant with regard to its steepness and linearity. The telescopic strut thereby has a sufficiently steep and essentially linear characteristic line in the range between the minimum spring deflection travel and the spring deflection travel that corresponds to the second predetermined position. The second predetermined position is defined so that, if the floating piston has reached this second predetermined position, the spring deflection travel of the telescopic strut is so great that a steep characteristic line of the telescopic strut is desirable in order to avoid a possibly damaging achievement of the maximum possible spring deflection travel of the telescopic strut. For this, after reaching the second predetermined position of the separator element the auxiliary spring chamber is again isolated in terms of suspension fluid from the gas pressure chamber, wherein the characteristic line of the telescopic strut has a strongly progressive and thus steep curve. The characteristic line of the telescopic strut is thereby modeled by the corresponding predetermination of the first and second position, wherein given a spring travel up to the second predetermined position the characteristic line is sufficiently steep and essentially linear and has a high steepness after reaching the second predetermined position.

In certain embodiments, the construction of the telescopic strut, with the gas pressure chamber and the auxiliary spring chamber, is simple in its structure. The telescopic strut thereby includes only a few components, wherein the telescopic strut has a simple and reliable design and is lightweight. Via the use of the separator element with its stroke that correlates to the spring piston (but is significantly shorter) as an indicator for the stroke state of the telescopic strut, the switching device can be constructed as structurally short as possible and thereby additionally integrate it in a space-saving manner into the equalization cylinder. In contrast to this, given a design in which the switching device is directly activated by the spring piston, for example, the switching device would have to be significantly longer and thereby take up more structural space. The switching device could not be housed exclusively in the spring cylinder since this will nearly completely sweep beyond the spring piston during a working stroke of the telescopic strut, and thus structural space for the switching device is no longer provided.

In addition to the equalization chamber, the equalization reservoir in one embodiment includes a pressure chamber filled with suspension fluid. The pressure chamber forms the auxiliary spring chamber and is divided from the equalization chamber with the separator element in the equalization reservoir. The equalization chamber thereby advantageously has a double function since the equalization chamber additionally forms the auxiliary spring chamber. Advantageously, no additional auxiliary spring chamber needs to be provided for the telescopic strut, whereby the telescopic strut is simple and compact in its design.

In one embodiment, the switching device includes a two-position valve with which the auxiliary spring chamber can be isolated in terms of fluid from the gas pressure chamber in the closed position. A shunt line includes a nonreturn valve having a transmission direction in the flow direction from the auxiliary spring chamber to the gas pressure chamber. With the two-position valve in the closed position, a spring fluid-conductive connection between the gas pressure chamber and the auxiliary chamber via the nonreturn valve is only possible if the pressure of the suspension fluid in the auxiliary spring chamber is greater than the pressure of the suspension fluid in the gas pressure chamber. The nonreturn valve is therefore switched to transmit and a pressure equalization between the auxiliary spring chamber and the gas pressure chamber can occur. If the telescopic strut has completely rebounded, the pressure is greater in the auxiliary spring chamber than in the gas pressure chamber. Upon spring deflection of the telescopic strut, the pressure in the gas pressure chamber increases and ultimately reaches the pressure in the auxiliary spring chamber. If the two-position valve is in the closed position and the position of the separator element is between the first predetermined position and the second predetermined position, a pressure equalization from the auxiliary spring chamber to the gas pressure chamber can take place via the nonreturn valve. It is thereby advantageously prevented that the pressure of the spring fluid in the gas pressure spring continuously decreases during operation of the telescopic strut, for example caused by a leakage of the spring fluid from the gas pressure spring. Furthermore, via the arrangement of the nonreturn valve it is achieved that—even given closure of the two-position valve while the separator element is already arranged in the position range between the first predetermined position and the second predetermined position, and thus the auxiliary spring chamber is connected in a spring fluid-conductive manner with the gas pressure chamber—the gas pressure spring and the auxiliary spring chamber can return to their original gas pressure level (deflection stroke=zero) and, due to the still-closed two-position valve, now remain separate in a spring fluid-sealed manner in any spring deflection state of the telescopic strut given a new stroke process of the telescopic strut. This is the case while the telescopic strut returns to its initial position via rebound, controlled by the switching device and enabled by the transmission direction of the nonreturn valve that is oriented in this direction.

In one embodiment, the coupling includes a position sensor to detect the current position of the separator element and an actuator activated by the position sensor, with which actuator the switching device can be driven. In this embodiment, a signal processing unit is connected between the position sensor and the actuator. The signal processing unit enables the user to either directly shift the connection states between the gas pressure spring and the auxiliary spring chamber depending on the stroke of the separator element that is determined by the position sensor (and therefore depending on the spring deflection state of the telescopic strut), or to vary the connection states in terms of their length (and therefore to program the signal processing unit, or to input the connection states via an external operating device with a graphical user interface (for example a PC or a smart phone), for example via manipulation of the characteristic spring line of the telescopic strut that is graphically depicted on this user interface, and subsequently to overwrite this stroke-dependent switching information (generated in such a manner at the external operating device) for the actuator to the signal processing unit via an interface and to thus program the signal processing unit. A temperature sensor that measures the temperature of the damper fluid can also be connected to the signal processing unit, such that the signal processing unit compensates the temperature change caused by the damping work of the shock absorber (and the volume change of the damper fluid that is incurred with this) by adjusting a start length of the actuator, and thus compensates the variation of the switching points in time of the switching device. Alternatively, via the temperature sensor and/or the position sensor, the signal processing unit detects, for example, a slow uphill drive with a low spring deflection frequency of the telescopic strut or a fast downhill drive with a correspondingly high spring deflection frequency of the telescopic strut and associates specific, stroke-dependent switching points in time of the switching device with this operating state.

In an alternative embodiment, the coupling is a rigid connection element attached to the separator element for a rigid coupling of the switching device with the separator element. The separator element is thereby directly coupled with the switching device, whereby the switching device is directly operated by the separator element. In one embodiment, the telescopic strut cylinder, the auxiliary spring chamber and the pressure chamber are arranged concentrically and/or situated one after another. The coupling can be designed such that it compensates for the temperature change (and therefore the volume change) of the damper fluid that is caused by the shock absorber by execution of damping work—and therefore compensates the variation of the switching points in time of the switching device that arises in this manner—via the length of the coupling, its alignment between the separator element and the switching device, its wetting by the damper fluid, and the coefficients of thermal expansion of its materials. The obverse effect can also advantageously be used so that an increased heating of the damper fluid by the damping work executed by the shock absorber leads to the situation that the switching points in time of the switching device are displaced in a controlled manner in order to adapt the characteristic spring line of the telescopic strut to the current operating state. This effect can be quantitatively controlled via length, alignment between the separator element and the switching device, via wetting by the damper fluid and via the coefficients of thermal expansion of the material of the coupling.

In one embodiment, the switching device is a slider with a slider opening formed by a first opening edge and a second opening edge whose positions define the position range, wherein with the uncovered slider opening the auxiliary spring chamber is connected with the gas pressure chamber such that suspension fluid can be conducted, and with the covered slider opening the auxiliary spring chamber is isolated in terms of suspension fluid from the gas pressure chamber. In one embodiment, the equalization reservoir is an equalization cylinder and the separator element is a floating piston that is borne floating in the equalization cylinder such that it can be displaced. The coupling, in certain embodiments, is a hollow cylindrical collar that is concentrically attached to the floating piston and extends into the equalization chamber, wherein in the equalization chamber a sliding cylinder is provided that is arranged concentrically around the collar, which is arranged such that it can be displaced in the longitudinal direction of the floating piston and adjoins the sliding cylinder to form a suspension or spring fluid seal, such that in the equalization cylinder the equalization chamber is fashioned annularly around the collar and the sliding cylinder. The floating piston thereby includes a central longitudinal passage, and the inner space of the sliding cylinder is connected in a fluid-conductive manner with the gas pressure spring, such that the pressure chamber is connected in a spring fluid-conductive manner with the gas pressure spring via the collar and the sliding cylinder.

In one embodiment, the switching device includes a rod on which is mounted a circumferential groove as a slider opening. The groove is bounded (when viewed axially) by a first groove edge forming the first slider opening border and a second groove edge forming the second slider opening border. An end of the collar facing away from the floating piston includes a circumferential bead that radially adjoins the rod such that a suspension or spring fluid seal is formed if the bead is arranged outside of the groove due to a current position of the floating piston. The circumferential bead is arranged at a radial distance from the rod if the bead is arranged in the groove due to a current position of the floating piston, such that the bead interacts with the groove such that the position range is defined by the groove edges. The rod can be displaced longitudinally, whereby the position range can be adjusted via the selected position of the rod. The switching device alternatively includes a bushing at which a circumferential step is fashioned on the inside that, viewed axially, forms the second slider opening edge, whereby the bushing is tapered and the end of the collar that faces away from the floating piston includes a circumferential bead that radially adjoins the step such that a suspension or spring fluid seal is formed if the bead is arranged on a first side of the step due to the current position of the floating piston. The circumferential bead is arranged at a radial distance from the bushing if the bead is arranged on a second side of the step due to a current position of the floating piston, such that the bead interacts with the bushing such that the position range is defined by the step.

In one embodiment, the spring cylinder is divided by the floating piston into a negative chamber and a primary chamber that is connected with the auxiliary spring chamber via the switching device such that spring fluid can be conducted. The damper cylinder is divided by the damper piston into a counter-chamber and a work chamber that is connected with the equalization reservoir such that spring fluid can be conducted. In one embodiment, the damper piston includes a damper piston nonreturn valve that is brought into an open position upon spring deflection of the telescopic strut and is brought into a closed position upon rebound of the telescopic strut. The damper cylinder includes an equalization nonreturn valve at the connection of the work chamber with the equalization reservoir, which equalization nonreturn valve is brought into the closed position upon spring deflection of the telescopic strut and is brought into the open position upon rebound of the telescopic strut. With the damper piston nonreturn valve and/or the equalization nonreturn valve, it can advantageously be achieved that cavitation in the damper fluid is suppressed under a fast actuation of the telescopic strut. The cavitation in the damper fluid is in particular harmful if too great a volume of damper fluid is transported into the equalization reservoir due to the creation of gas bubbles in the damper fluid, from which a faulty operation of the control device results due to the coupling between the separator element and the control device.

BRIEF DESCRIPTION OF THE DRAWINGS

Certain embodiments will now be described, by way of non-limiting examples only, with reference to the accompanying drawings, in which.

DETAILED DESCRIPTION

Figure 1:
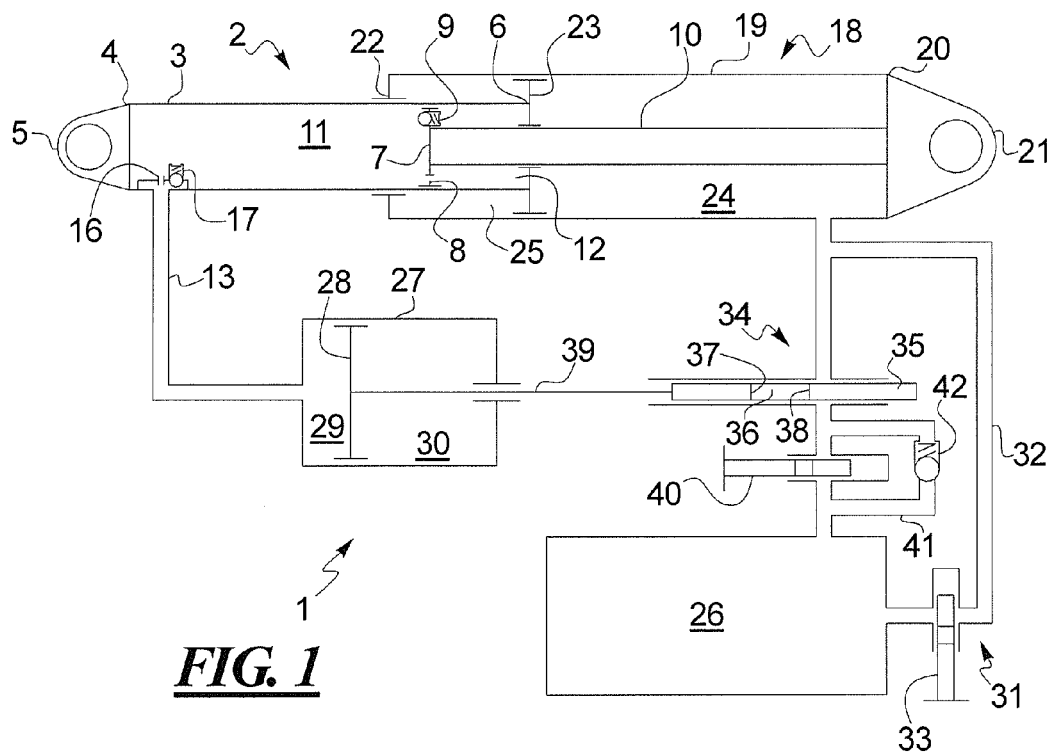
FIG. 1 is a schematic view of an exemplary embodiment of a telescopic strut.
Figure 2:
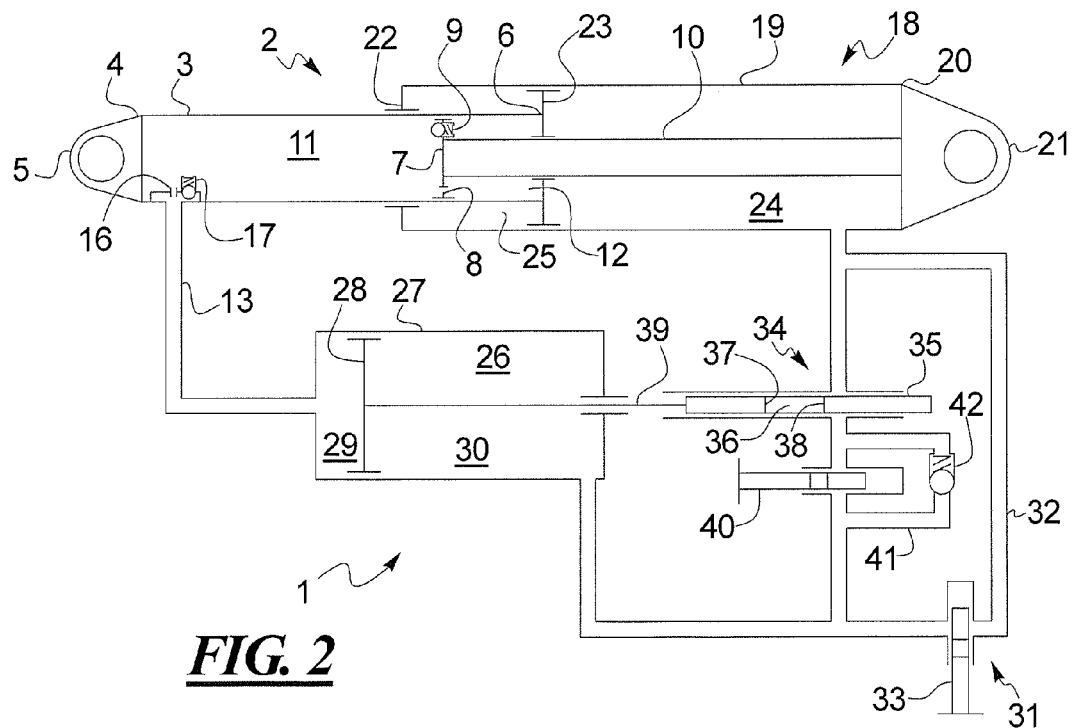
FIG. 2 is a schematic view of an alternative embodiment of a telescopic strut.
Figure 3:
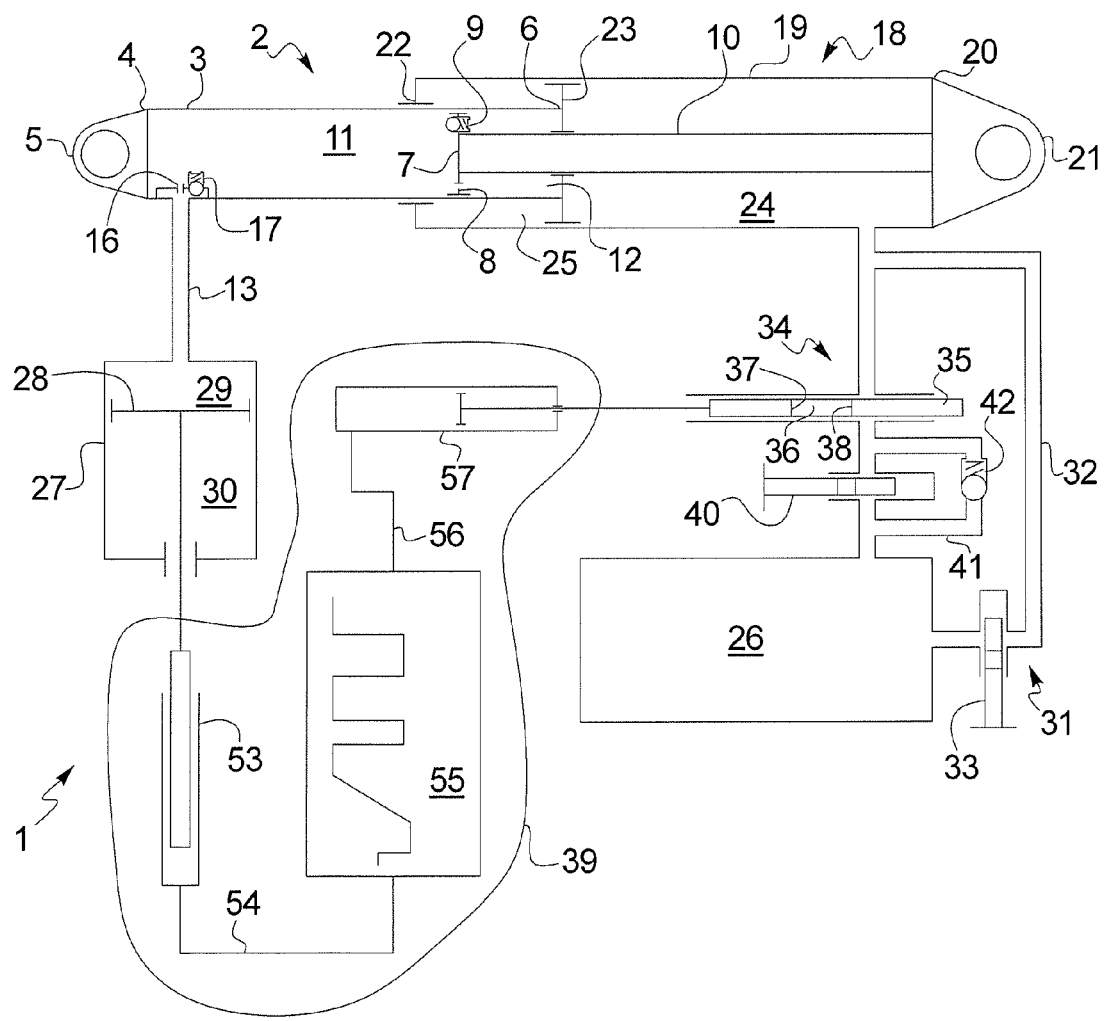
FIG. 3 is a schematic view of a further alternative embodiment of a telescopic strut.

The embodiments described herein relate to a hydropneumatic telescopic strut for a bicycle having a low weight and an optimally linear characteristic line in broad ranges. Although the embodiments are described herein with reference to a hydropneumatic telescopic strut for a bicycle, this is by way of example only, it being understood that the embodiments may be implemented with any suitable vehicle or apparatus.

Referring to FIGS. 1-12, a hydropneumatic telescopic strut 1 includes a shock absorber 2 with a damper cylinder 3 having at a damper cylinder head 4 a running wheel eye 5 to which a wheel, such as a rear running wheel of a bicycle, can be coupled. A damper cylinder edge 6 is configured at a longitudinal end of the damper cylinder 3 that faces away from the damper cylinder head 4. The damper cylinder 3 is filled with a damper fluid. A damper piston 7 is positioned in the damper cylinder 3 such that the damper piston 7 can be displaced longitudinally in the damper fluid. The damper piston 7 defines a passage 8 so that the damper fluid is pushed through the passage 8 upon displacement of the damper piston 7 in the damper cylinder 3. Upon transmission of the damper fluid through the passage 8, a resistance force that can act as a damping force of the telescopic strut 1 arises depending on the velocity of the damper piston 7. A damper piston nonreturn valve 9 is connected to the damper piston 7 and in parallel with the passage 8. The damper piston nonreturn valve 9 is brought into an open position upon spring deflection of the telescopic strut 1 and is brought into a closed position upon rebound of the telescopic strut 1.

The damper piston 7 includes a damper piston rod 10 with which the damper piston 7 can be actuated from outside the damper cylinder 3 via the damper cylinder edge 6. An inner space of the damper cylinder 3 is divided by the damper piston 7 into a work chamber 11 facing away from the damper piston rod 10 and a counter-chamber 12 facing towards the damper piston rod 10. If the damper piston 7 is driven into the damper cylinder 3, the portion of the damper piston rod 10 that is located in the damper cylinder 3 is increased, whereby damper fluid is displaced by the damper piston rod 10.

Figure 4:
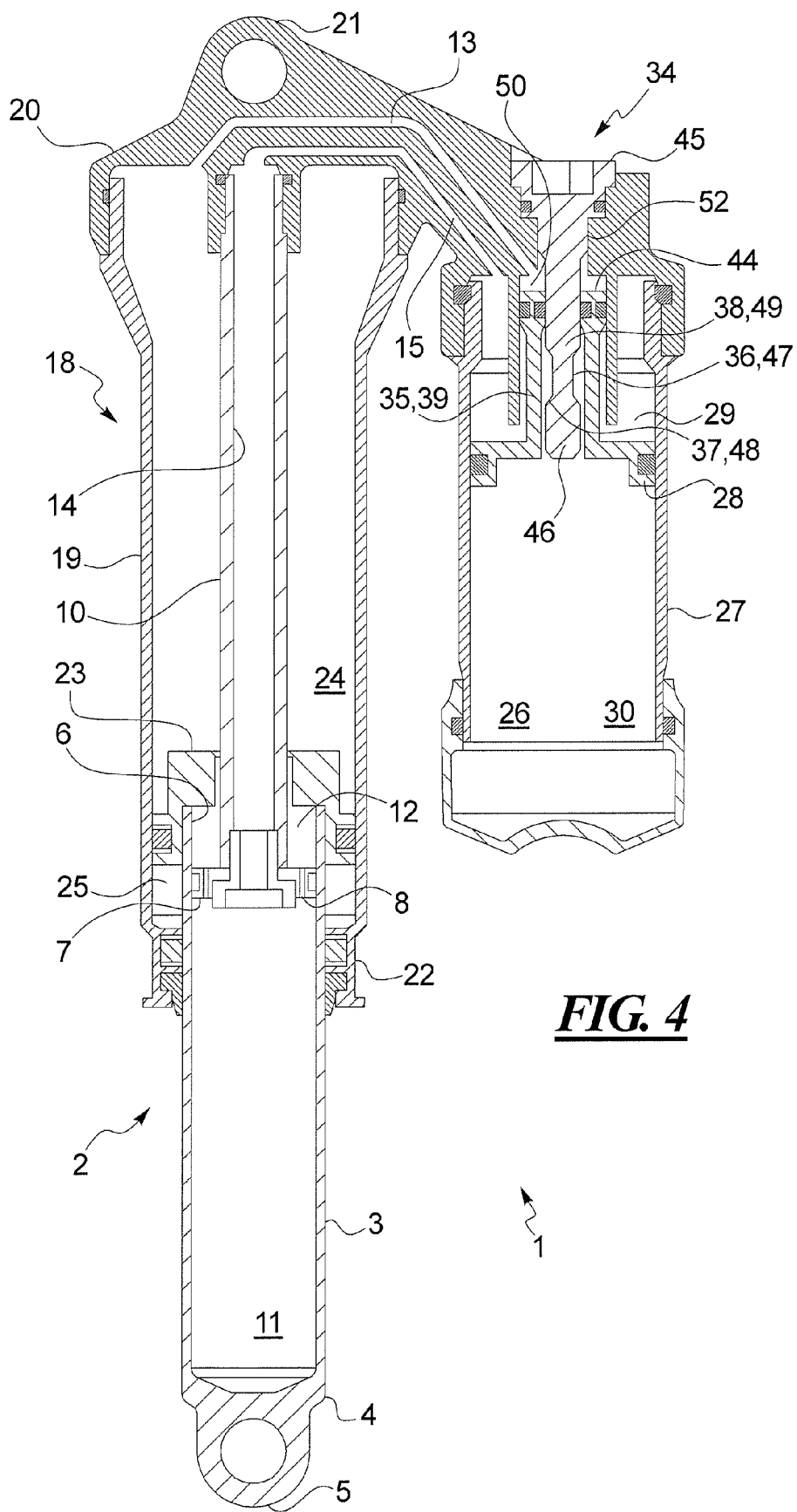
FIG. 4 is a sectional view of the telescopic strut shown in FIG. 2 suitable for a rear running wheel of a bicycle, with the telescopic strut in a rebounded position.
Figure 5:
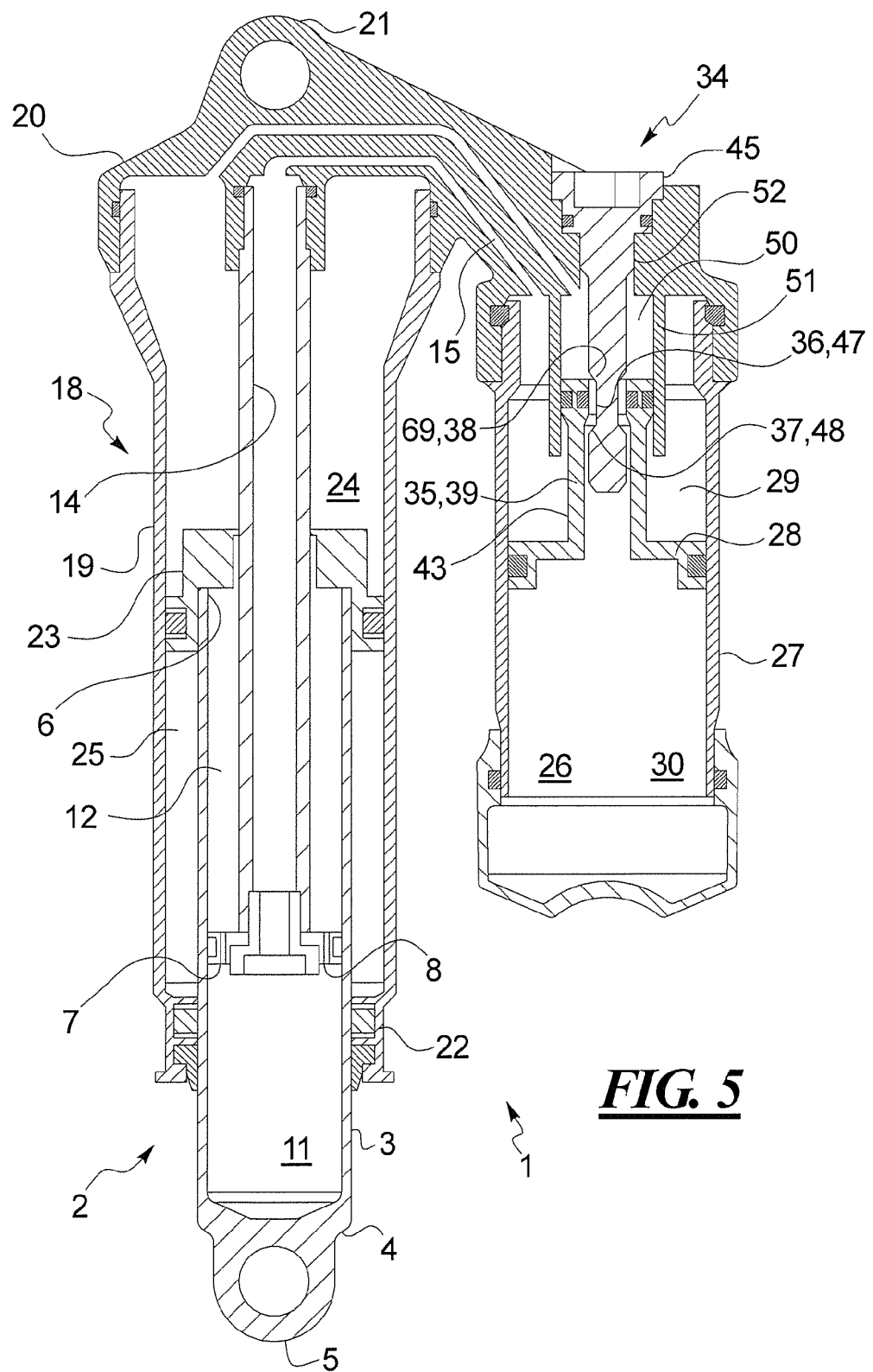
FIG. 5 is a sectional view of the telescopic strut shown in FIG. 2 suitable for a rear running wheel of a bicycle, with the telescopic strut in a middle spring deflection position.
Figure 6:
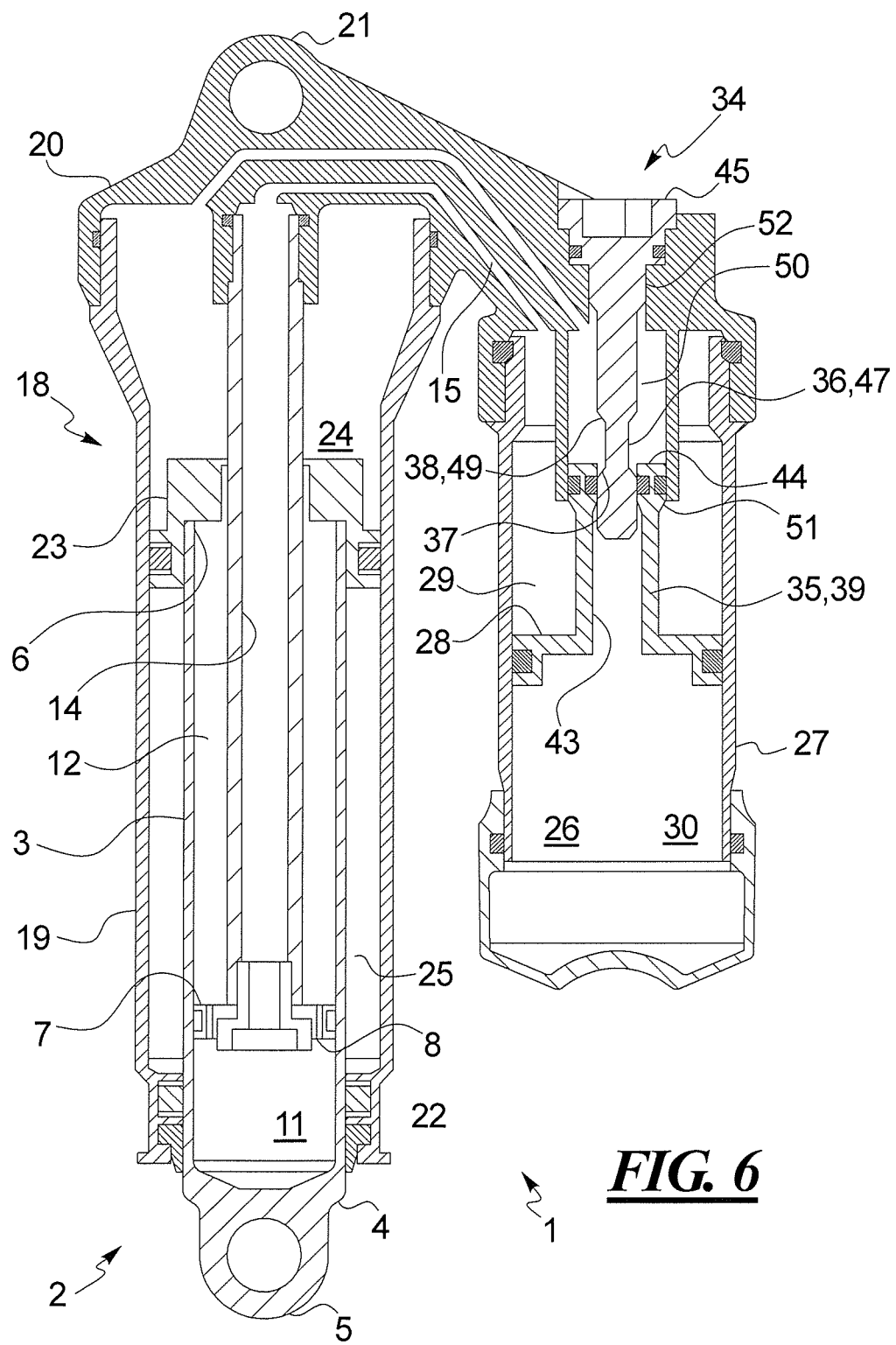
FIG. 6 is a sectional view of the telescopic strut shown in FIG. 2 suitable for a rear running wheel of a bicycle, with the telescopic strut in a completely deflected position.

An equalization line 13 in fluid communication with the work chamber 11 is provided at the damper cylinder 3. Damper fluid displaced from the work chamber 11 can be discharged through equalization line 13. As shown in FIGS. 4-6, the damper piston rod 10 is configured as a damper piston rod tube 14. The equalization line 13 is formed by the damper piston rod tube 14 and an equalization channel 15. An equalization baffle 16 with which the flow resistance of the damper fluid through the equalization line 13 is defined is provided at a mouth of the equalization line 13 into the work chamber 11. The equalization baffle 16 is formed by the equalization channel 15 shown in FIGS. 4-6. In that the equalization baffle 16 or, respectively, the equalization channel 15 forms a bottleneck in the passage of the damper fluid through the equalization line 13, a damping effect for the telescopic strut 1 arises from the equalization baffle 16 or, respectively, the equalization channel 15. An equalization nonreturn valve 17 is attached to the equalization baffle 16. The equalization nonreturn valve 17 is brought into a closed position upon spring deflection of the telescopic strut 1 and is brought into an open position upon rebound of the telescopic strut 1.

The telescopic strut 1 also includes a gas pressure chamber 18 with a spring cylinder 19 having a first end formed by a spring cylinder head 20. A frame eye 21 at which a frame of the bicycle can be mounted is provided at the spring cylinder head 20. The equalization channel 15 is also defined through the spring cylinder head 20. The spring cylinder 19 includes a spring cylinder seal 22 at a second end opposing the first end and facing away from the spring cylinder head 20. The damper cylinder 3 is directed through the spring cylinder seal 22. A spring piston 23 is mounted at the damper cylinder edge 6 and arranged such that spring piston 23 can be displaced longitudinally in the spring cylinder head 20. Referring further to FIGS. 1-6, the piston rod 10 is attached to the spring cylinder head 20 and conducted through the spring piston 23 so that the damper piston 7 can be actuated from the frame eye 21 via the damper piston rod 10. The spring piston 23 can also be actuated from the running wheel eye 5 via the damper cylinder 3 so that the shock absorber 2 and the gas pressure spring 18 can be telescopically displaced within one another upon spring deflection and rebound of the telescopic strut 1.

The spring cylinder 19 is filled with a suspension or spring fluid. The spring cylinder 19 is divided by the spring piston 23 into a primary chamber 24 and a negative chamber 25. Upon spring deflection of the telescopic strut 1, the spring piston 23 is moved into the spring cylinder 19 so that the volume of the primary chamber 24 decreases and the volume of the negative chamber 25 increases. Due to the compressibility of the spring fluid, the spring fluid charged by the spring piston 12 in the primary chamber 24 and the negative chamber 25 acts in an elastic manner so that an elastic coupling by the gas pressure spring 18 and a damping coupling by the shock absorber 2 are achieved between the running wheel eye 5 and the frame eye 21.

The telescopic strut 1 moreover includes an auxiliary spring chamber 26 that can be selectively connected with the primary chamber 24. If the auxiliary spring chamber 26 is connected with the primary chamber 24, the spring fluid that is compressed upon spring deflection of the telescopic strut 1 has a volume that is defined by the primary chamber 24 and the auxiliary spring chamber 26. If the auxiliary spring chamber 26 is isolated from the primary chamber 24 by a suspension or spring fluid seal, the volume of the auxiliary spring chamber 26 is ineffective for the gas pressure spring 18. The telescopic strut 1 includes an equalization cylinder 27 in which a floating piston 28 is arranged floating such that floating piston 28 can be displaced. The equalization cylinder 27 is subdivided by the floating piston 28 into an equalization chamber 29 and a pressure chamber 30. The equalization line 13 is directed into the equalization chamber 29, wherein the equalization chamber 29 is filled by the damper fluid. The pressure chamber 30 is filled with gas.

In the embodiments shown in FIGS. 2 and 4-6, the pressure chamber 30 is the auxiliary spring chamber 26, wherein the pressure chamber 30 is filled with spring fluid. Referring further to FIGS. 4-6, the pressure chamber 30 of the equalization cylinder 27 is sealed with a cap that can be mounted on the equalization cylinder 29 such that the cap can be displaced longitudinally, whereby the volume of the pressure chamber 30 (and thus the volume of the auxiliary spring chamber 26) is variable and thus can be adjusted.

A first connection line is provided between the primary chamber 24 and the auxiliary spring chamber 26, in which a first connection line 32 is installed a manually-operable first two-position valve 33. The auxiliary spring chamber 26 can thereby be connected with the primary chamber 24 in a spring fluid-conductive manner via actuation of the first two-position valve 33. The telescopic strut 1 also includes an automatic switching device 34 that is connected in parallel with the first connection line 32 and the first two-position valve 33. In one embodiment, the automatic switching device 34 includes a slider 35 that defines a slider opening 36 formed by a first slider opening edge 37 and a second slider opening edge 38. The slider 35 is coupled with the floating piston 28 by means of a slider coupling 39 and can thereby be actuated. As shown in FIGS. 1, 2, and 4-6, the slider coupling 39 is a rigid connection between the floating piston 28 and the slider 35, in one embodiment.

A second two-position valve 40 is connected between the auxiliary spring chamber 26 and the slider 35, with which second two-position valve 40 the spring fluid-conducting connection between the slider 35 and the auxiliary spring chamber 26 can be selectively disconnected so as to form a suspension or spring fluid seal. A circumvention line 41 is directed around the second two-position valve 40. The circumvention line 41 includes a nonreturn valve 41 having a transmission direction from the auxiliary spring chamber 26 to the primary chamber 24.

A second position of the floating piston 28 is represented by the first slider opening edge 37 and a first position of the floating piston 28 is represented by the second slider opening edge 38. If the floating piston 28 is in the first predefined position, via the slider coupling 39, the slider 35 is positioned such that the slider opening 36 is uncovered due to the action of the second slider opening edge 38. If the floating piston 28 is located in the second predefined position, via the coupling of the slider 35 with the floating piston 28 by means of the slider coupling 39, the slider 35 is also positioned such that the slider opening 36 is uncovered via the action of the first slider opening edge 37. If the floating piston 28 is in a position that is between the first predetermined position and the second predetermined position, the slider opening 36 is uncovered, such that the auxiliary spring chamber 26 is connected in a spring fluid-conductive manner with the primary chamber 24 if the second two-position valve 40 is in the open position. In contrast to this, if the second two-position valve 40 is in the closed position, a spring fluid-conductive connection between the primary chamber 24 and the auxiliary spring chamber 26 can be established via the nonreturn valve 42 if the pressure of the spring fluid that is located in the auxiliary spring chamber 26 is greater than the pressure of the spring fluid that is located in the primary chamber 24. The nonreturn valve 42 is then brought into the open position, whereby a pressure equalization between the primary chamber 24 and the auxiliary spring chamber 26 arises. The action of the switching device 34 is neutralized by the open position of the first two-position valve 33.

Referring to FIGS. 4-7, the automatic switching device 34 has a collar 43 that forms the slider 35 and the slider coupling 39. The collar 43 is mounted concentrically on the side of the floating piston 28 that faces towards the equalization chamber 29. A circumferential bead 44 that radially projects on the inside and outside of the collar is provided on the longitudinal end of the collar 43 that faces away from the floating piston 28. A rod 45 protruding into the collar 43 and concentrically arranged is held in the equalization cylinder 27. The rod 45 extends in the direction of the floating piston 28 and, with its free rod tip 46, extends into the collar 43 on the other side of the bead 44. En the region of the bead 44, a circumferential groove 47 is provided on the surface of the rod 45. The groove 47 is axially bounded on the rod 45 by a first groove edge 48 and a second groove edge 49. An annular space 50 that is bounded by a sliding cylinder is formed around the rod 45. The annular space 50 is connected in a spring fluid-conductive manner with the primary chamber 24 and is thereby sealed by the equalization chamber 29 in that the bead 44 rests on the inside of the sliding cylinder 51. Given a displacement movement of the floating piston 28 in the equalization cylinder 27, the bead 44 sweeps along the sliding cylinder 51, wherein the equalization chamber 29 in which damper fluid is located is sealed off from the annular space 50 in which spring fluid is located.

The bead 44 and the groove 47 are dimensioned such that, if the bead 44 is arranged at the level of the groove 47, the bead 44 is arranged at a distance from the rod 45 so that a passage from the annular space 50 to the auxiliary spring chamber 26 is opened past the bead 44 and through the groove 47. The bead 44 sweeps over the first groove edge 46 if the floating piston is located in the second predefined position and the bead 44 sweeps over the second groove edge 49 when the floating piston 28 is located in the first predefined position. The passage between the annular space 50 and the auxiliary spring chamber 26 is thereby uncovered if the bead 44 is arranged between the groove edges 48, 49 and blocked when the bead 44 is arranged outside the groove 47, i.e., on the far side of the groove edges 48, 49, wherein the bead 44 rests on the rod 45 so as to form a seal.

Figure 7:
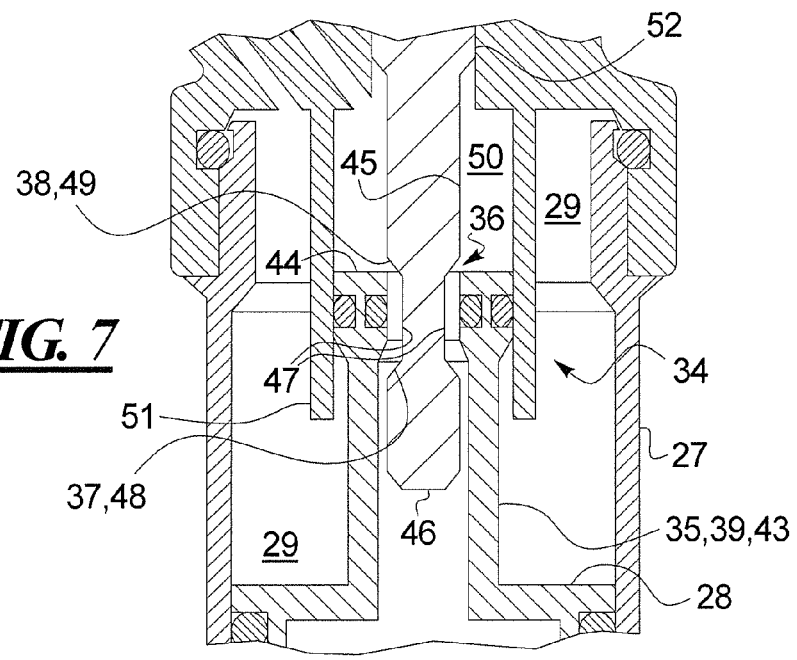
FIG. 7 is a sectional view of a portion of the telescopic strut as shown in FIG. 5 showing an exemplary switching device.
Figure 8:
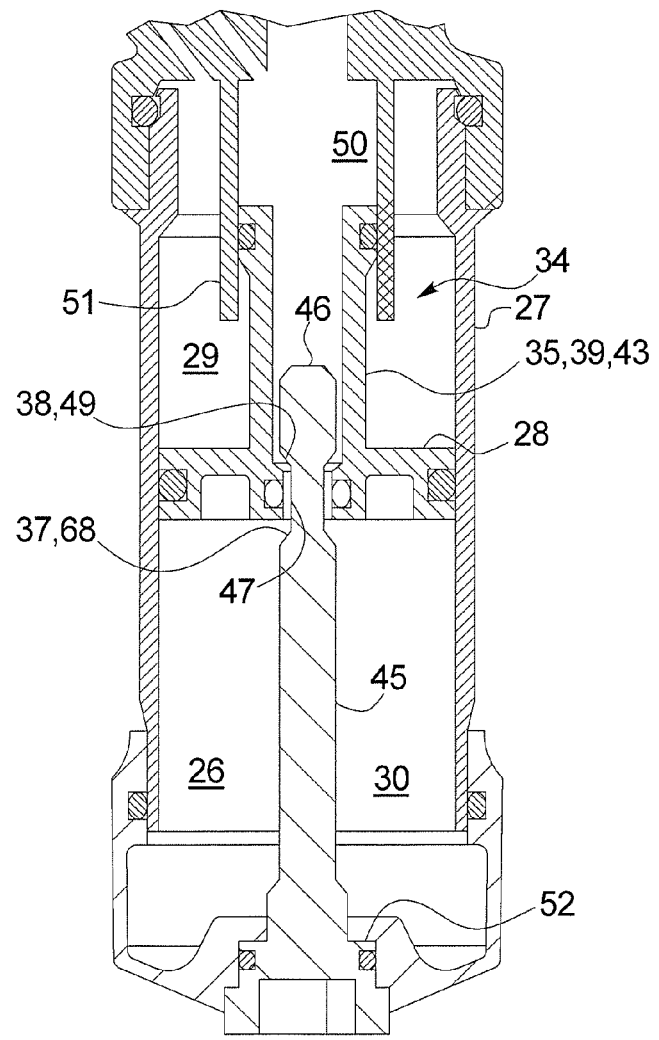
FIG. 8 is a sectional view of a portion of a telescopic strut showing an alternative switching device.

In an alternative embodiment as shown in FIG. 8, the pin 45 of the switching device 34 extends into the pressure chamber 30. As shown in FIGS. 7 and 8, the rod 45 is held in a rod receptacle 52 such that it can be longitudinally displaced so that the first predefined position and the second predefined position of the floating piston 28 can be variably adjusted via a correspondingly selected position of the rod and the position of the groove edges 48 and 49 that results from this.

Referring again to FIG. 3, the slider coupling 39 includes a position sensor 53 that is mechanically coupled with the floating piston 28. Depending on the position of the floating piston 28, the position sensor 53 is activated that translates the position of the floating piston 28 into an electrical signal that is conducted by a first signal line 54 to a signal process unit 55. The signal can be processed in the signal process unit 55 and is provided as a sensor signal in a second signal line 56 to an actuator 57 with which the automatic switching device 34 can be actuated.

Figure 9:
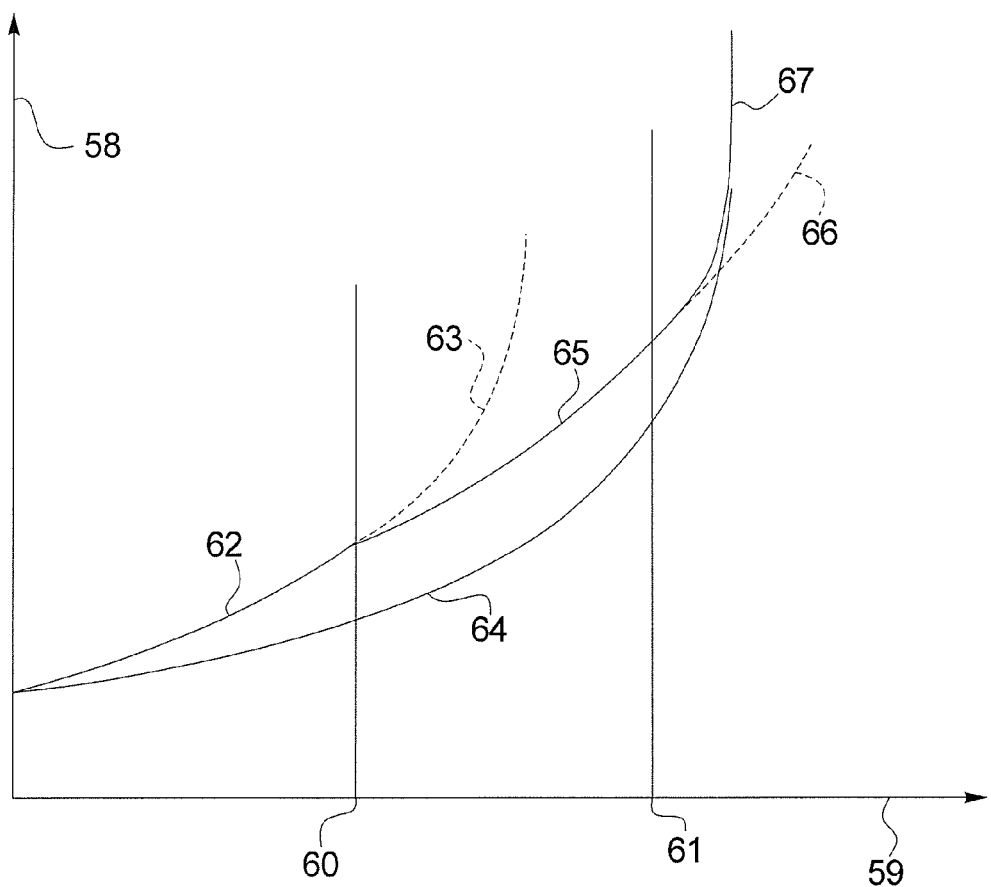
FIG. 9 is a characteristic line for a hydropneumatic telescopic strut of an elastic force plotted over a spring deflection stroke.

A characteristic line of the telescopic strut 1 is shown in FIG. 9, wherein an elastic force 58 is plotted over a spring deflection stroke 59. If the telescopic strut 1 is correspondingly deflected so that the floating piston 28 is located in a first predefined position, the switching device 34 is found in a first switch position 60, and if the telescopic strut 1 is deflected so that the floating piston 28 is located in the second predefined position, the automatic switching device 34 is in a second switch position 61. Between the first switch position 60 and the second switch position 61, the auxiliary spring chamber 26 can be connected in a spring fluid-conductive manner with the primary chamber 24.

If the first two-position valve 33 and the second two-position valve 40 are respectively in the closed position, to deflect the gas pressure spring 18 the primary chamber 24 is always separate from the auxiliary spring chamber 26. Only the primary chamber 24 thus acts to deflect the gas pressure spring 18, from which the first characteristic line segments 62 and 63 result. In contrast to this, if the first two-position valve 33 is in the open position, the primary chamber 24 and the auxiliary spring chamber 26 act together so that a third characteristic line segment 64 results that has a less steep curve than the characteristic line segments 62, 63. The characteristic line segments 63, 64 have a progressive curve. If the first two-position valve 33 is in the closed position and the second two-position valve 40 is in the open position, given a spring stroke of the telescopic strut 1 that lies between the first switch position 60 and the second switch position 61 the primary chamber 24 is connected in a spring fluid-conductive manner with the auxiliary spring chamber 26, and if the spring stroke is less than the first switch position 60 or greater than the second switch position 61 the primary chamber is isolated in terms of spring fluid from the auxiliary spring chamber 26. A characteristic line thereby results that is composed of the first characteristic line segment 62, a fourth characteristic line segment 65 and a sixth characteristic line segment 67. The fourth characteristic line segment 65 is analogous to the third characteristic line segment 64 and the sixth characteristic line segment 67 is analogous to the second characteristic line segment 63. If the second switch position 61 in FIG. 9 was displaced further to the right, a separation of the auxiliary spring chamber 26 from the primary chamber 24 would not take place and the fourth characteristic line segment 65 would, as a fifth characteristic line segment 66, have a flatter curve than the characteristic line segment 67.

Figure 10:
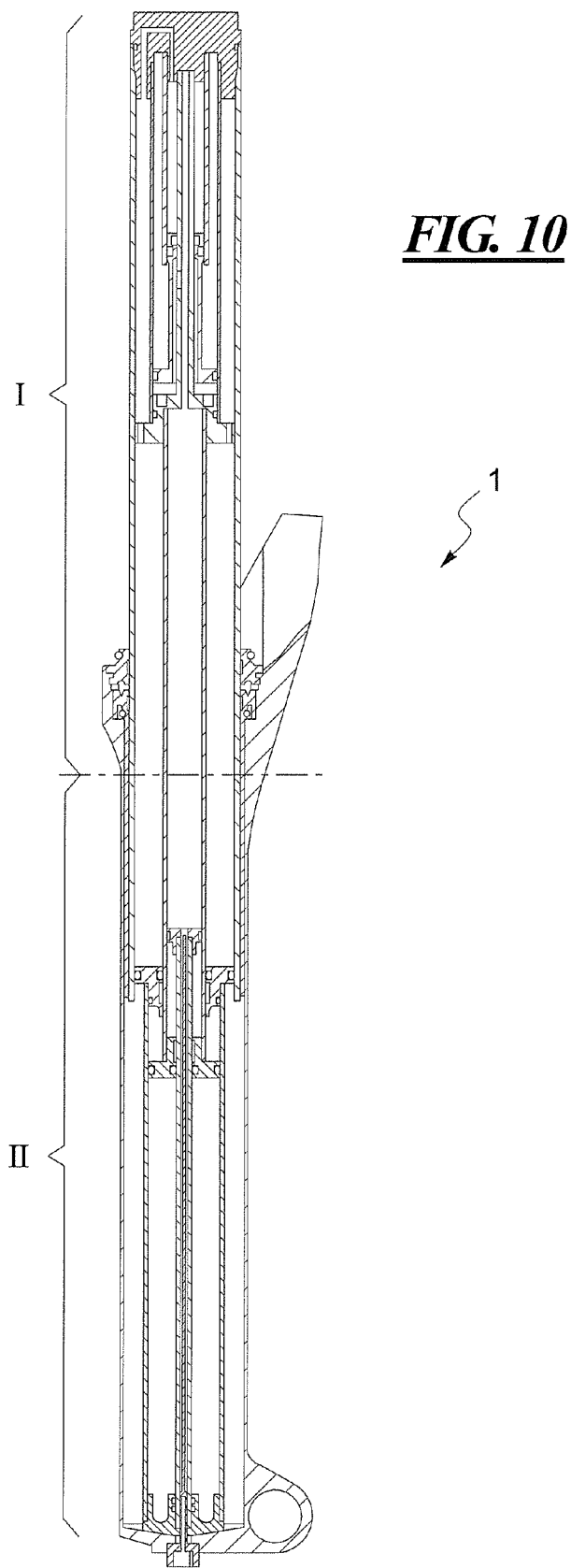
FIG. 10 is a sectional view of an exemplary embodiment of a telescopic strut suitable for a front running wheel of a bicycle.
Figure 11:
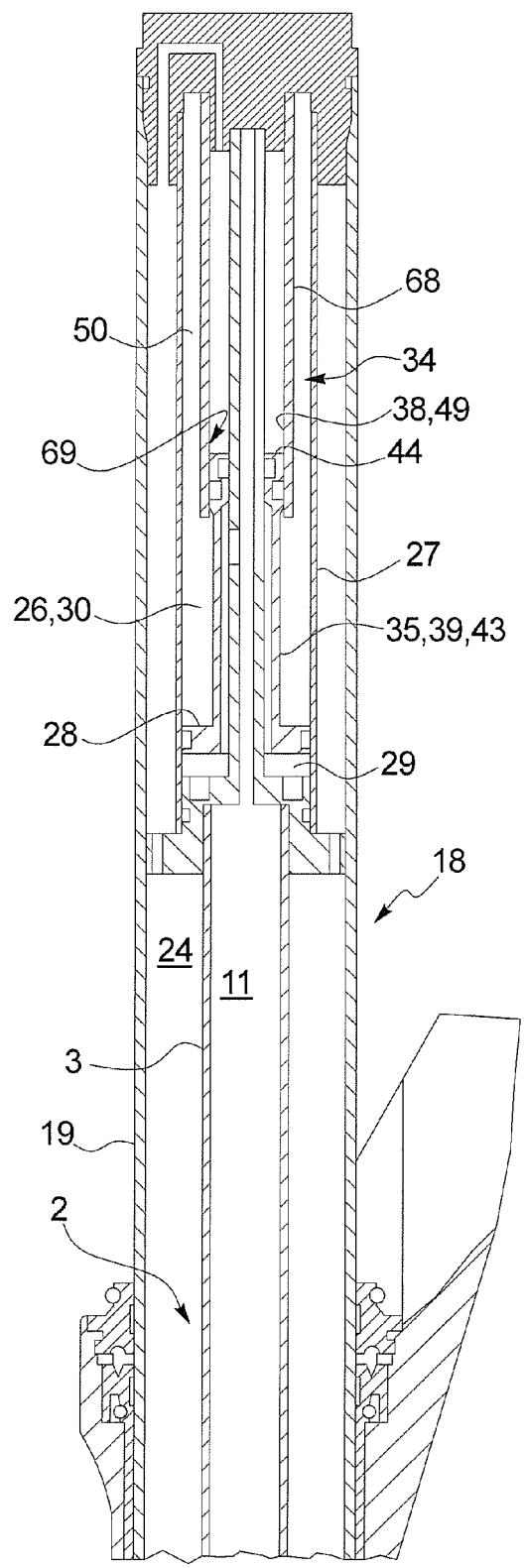
FIG. 11 is a sectional view of Detail I of the telescopic strut shown in FIG. 10.
Figure 12:
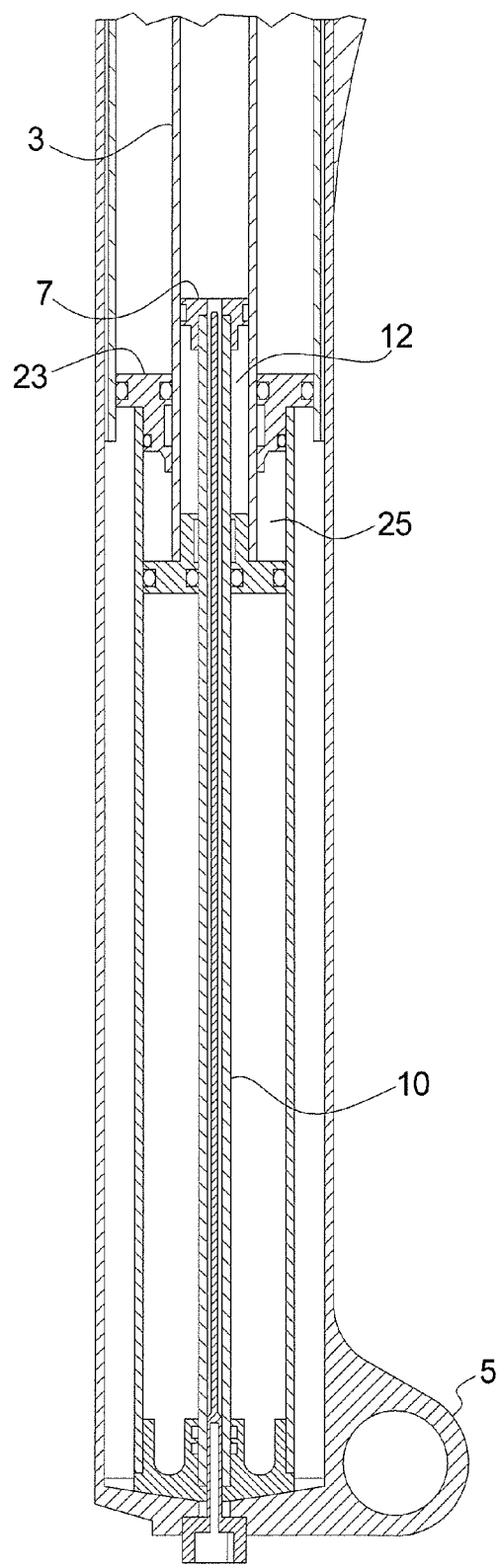
FIG. 12 is a sectional view of Detail II of the telescopic strut shown in FIG. 10.

In one embodiment as shown in FIGS. 10-12, the telescopic strut 1 is suitable for installation in a suspension fork of a bicycle to support a front running wheel. The switching device 34 possesses a sleeve 68 at which a circumferential step 69 is fashioned on the inside. The step 69, as viewed axially, forms the second slider opening edge 38, wherein the sleeve 68 is tapered. The end of the collar 43 facing away from the floating piston 28 also includes a circumferential bead 44 that radially rests on the sleeve 68 to form a spring fluid seal when the bead 44 is arranged on this side of the step 69 in a current position of the floating piston 28. If, given a current position of the floating piston 28, the bead 44 is arranged on the far side of the step 69, the bead 44 is arranged at a radial distance from the sleeve 68 so that the bead 44 with the sleeve 68 forms a passage, whereby the primary chamber 24 is connected in a spring fluid-conductive manner with the auxiliary spring chamber 26.

The described apparatus is not limited to the specific embodiments described herein. In addition, components of the apparatus may be practiced independent and separate from other components described herein. Each component also can be used in combination with other apparatus.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hydropneumatic telescopic strut for a bicycle, comprising:
    a shock absorber having a damper cylinder filled with an incompressible damper fluid, a damper piston configured for displacement in the damper cylinder, and a damper piston rod with which the damper piston is operated from outside the damper cylinder;
    a gas pressure spring having a spring cylinder filled with a compressible suspension fluid and a spring piston arranged such that the spring piston is displaceable in the spring cylinder, wherein the shock absorber and the gas pressure spring are connected in parallel with one another and the shock absorber and the gas pressure spring is telescoped upon spring deflection and rebound of the telescopic strut;
    an equalization reservoir having an equalization chamber, the equalization reservoir connected with the damper cylinder such that the damper fluid is provided for volume equalization of a time-variable displacement of the damper fluid by the damper piston rod upon spring deflection and rebound of the telescopic strut;
    a displaceable separator element positioned in the equalization chamber to delimit the equalization chamber with which volume equalization is accomplished via displacement of the separator element;
    an auxiliary spring chamber filled with suspension fluid;
    a switching device; and
    a coupling with which the switching device is coupled with the separator element such that the auxiliary spring chamber is connected with the spring cylinder, wherein if the separator element is arranged in a position range between a first predetermined position and a second predetermined position, suspension fluid is conducted, and if the separator element is arranged outside of the position range, the auxiliary spring chamber is isolated in terms of suspension fluid from the spring cylinder.

2. The telescopic strut according to claim 1, wherein the equalization reservoir comprises a pressure chamber filled with the suspension fluid in addition to the equalization chamber, wherein the pressure chamber forms the auxiliary spring chamber and is separated from the equalization chamber in the equalization reservoir with the separator element.

3. The telescopic strut according to claim 1, wherein the switching device comprises:
    a two-position valve configured to isolate the auxiliary spring chamber from the spring cylinder in the closed position; and
    a shunt line having a nonreturn valve circumventing the two-position valve, wherein a transmission direction of the nonreturn valve is in the flow direction from the auxiliary spring chamber to the spring cylinder.

4. The telescopic strut according to claim 1, wherein the coupling comprises:
    a position sensor to detect a current position of the separator element; and
    an actuator activated by the position sensor and configured to drive the switching device.

5. The telescopic strut according to claim 1, wherein the coupling comprises a rigid connection element coupled to the separator element for a rigid coupling of the switching device with the separator element.

6. The telescopic strut according to claim 5, wherein the switching device comprises a slider with a slider opening defined by a first opening edge and a second opening edge whose positions define the position range, wherein with the slider opening uncovered, the auxiliary spring chamber is connected with the spring cylinder such that suspension fluid is conducted, and with the slider opening covered, the auxiliary spring chamber is isolated in terms of suspension fluid from the spring cylinder.

7. The telescopic strut according to claim 6, wherein the equalization reservoir comprises an equalization cylinder and the separator element comprises a floating piston that is borne floating in the equalization cylinder, such that the floating piston is displaced within the equalization cylinder.

8. The telescopic strut according to claim 7, wherein the coupling comprises a hollow cylindrical collar that is concentrically attached to the floating piston and extends into the equalization chamber, wherein a sliding cylinder is provided in the equalization chamber that is arranged concentrically around the collar, which is arranged such that the collar is displaced in a longitudinal direction of the floating piston and couples to the sliding cylinder to form a suspension fluid seal, and wherein the equalization chamber is configured in the equalization cylinder annularly around the collar and the sliding cylinder.

9. The telescopic strut according to claim 8, further comprising a central longitudinal passage, and an inner space of the sliding cylinder is connected in a spring fluid-conductive manner with the spring cylinder such that a pressure chamber is connected in a spring fluid-conductive manner with the spring cylinder via the collar and the sliding cylinder.

10. The telescopic strut according to claim 9, wherein the switching device comprises a rod on which is mounted a circumferential groove as the slider opening, wherein the circumferential groove is bounded, in axial view, by a first groove edge forming a first slider opening border and a second groove edge forming a second slider opening border, and an end of the collar facing away from the floating piston comprises a circumferential bead that radially adjoins the rod, such that a suspension fluid seal is formed if the circumferential bead is arranged outside of the groove due to a current position of the floating piston, and the circumferential bead is arranged at a radial distance from the rod if the circumferential bead is arranged at the groove due to a current position of the floating piston, such that the circumferential bead interacts with the circumferential groove such that the position range is defined by the first groove edge and the second groove edge.

11. The telescopic strut according to claim 10, wherein the rod is displaced longitudinally to adjust the position range via a selected position of the rod.

12. The telescopic strut according to claim 9, wherein the switching device comprises a bushing at which a circumferential step is formed on an inner side that, in axial view, forms the second slider opening border, whereby the bushing is tapered and an end of the collar that faces away from the floating piston possesses a circumferential bead that radially adjoins the bushing such that a suspension fluid seal is formed if the circumferential bead is arranged on a first side of the step due to a current position of the floating piston; and the circumferential bead is arranged at a radial distance from the bushing if the circumferential bead is arranged on a second side of the step due to the current position of the floating piston, such that the circumferential bead interacts with the bushing such that the position range is defined by the step.

13. The telescopic strut according to claim 1, wherein the spring cylinder is divided by the spring piston into a negative chamber and a primary chamber that is connected with the auxiliary spring chamber via the switching device, for conduction of suspension fluid.

14. The telescopic strut according to claim 1, wherein the damper cylinder is divided by the damper piston into a counter-chamber and a work chamber that is connected with the equalization reservoir, for conduction of suspension fluid.

15. The telescopic strut according to claim 14, wherein the damper piston comprises a damper piston nonreturn valve that is brought into an open position upon spring deflection of the telescopic strut and is brought into a closed position upon rebound of the telescopic strut.

16. The telescopic strut according to claim 14, wherein the damper cylinder comprises an equalization nonreturn valve at a connection of the work chamber with the equalization reservoir, wherein the equalization nonreturn valve is brought into a closed position upon spring deflection of the telescopic strut and is brought into an open position upon rebound of the telescopic strut.

* * * * *